(12) United States Patent
Cooke et al.

(10) Patent No.: US 6,348,000 B1
(45) Date of Patent: Feb. 19, 2002

(54) TORSIONAL VIBRATION DAMPERS

(75) Inventors: Richard David Maitland Cooke, Warwick; Anthony John Curtis, Leamington Spa; Adam Johnson Lambert, Warwick, all of (GB)

(73) Assignee: AP Time Limited, Leamington Spa (GB)

( * ) Notice: Subject to any disclaimer, the term of this patent is extended or adjusted under 35 U.S.C. 154(b) by 0 days.

(21) Appl. No.: 09/402,902

(22) PCT Filed: Feb. 12, 1999

(86) PCT No.: PCT/GB99/00434

§ 371 Date: Mar. 8, 2000

§ 102(e) Date: Mar. 8, 2000

(87) PCT Pub. No.: WO99/41523

PCT Pub. Date: Aug. 19, 1999

(30) Foreign Application Priority Data

Feb. 13, 1998 (GB) .............................................. 9803049
Jul. 10, 1998 (GB) .............................................. 9814922
Jul. 21, 1998 (GB) .............................................. 9815747

(51) Int. Cl.$^7$ ................................................ F16D 3/60
(52) U.S. Cl. .............................. 464/66; 464/69; 74/574
(58) Field of Search .............................. 464/66, 68, 69; 192/70.18, 110 B, 204; 74/574

(56) References Cited

U.S. PATENT DOCUMENTS

| 268,807 A | * | 12/1882 | Landis | .......................... 464/69 |
| 2,379,255 A | * | 6/1945 | Rubissow | ..................... 74/574 |
| 3,868,820 A | * | 3/1975 | Lawson | ................... 74/89.2 X |
| 3,988,073 A | * | 10/1976 | Eastman et al. | .......... 74/574 X |
| 4,373,739 A | * | 2/1983 | Klem | ..................... 384/143 X |
| 4,657,683 A | * | 4/1987 | Davies | |
| 5,867,906 A | * | 2/1999 | Klassen | |
| 6,041,678 A | * | 3/2000 | Cooke et al. | ............. 464/68 X |
| 6,129,192 A | * | 10/2000 | Jackel et al. | .............. 464/68 X |

FOREIGN PATENT DOCUMENTS

| GB | 872550 | * | 7/1961 | ................... 464/69 |
| WO | WO-96/38681 | * | 12/1996 | |
| WO | WO-97/30298 | * | 8/1997 | |

* cited by examiner

Primary Examiner—Lynne H. Browne
Assistant Examiner—Greg Binda
(74) Attorney, Agent, or Firm—Paul E Milliken; Ray L Weber (57) ABSTRACT

A torsional vibration damper such as a twin mass flywheel (10), having an input clement (11) and an output element (12) which are relatively rotatable against the action of a damping means which includes a plurality of linkages(40). Each linkage has one or more links (41) mounted on one element (11) via pivot pins (43) which are arranged to extend generally radially in use and connected with the other element (12) by one or more additional links(42). The pivot pins (43) of the generally radially extending links (41) are supported from the associated damper element (11) via spaced bearings (43a, 43b). A number of Such spaced bearing arrangements are disclosed some of which hold grease captive.

27 Claims, 8 Drawing Sheets

TORSIONAL VIBRATION DAMPERS

FIELD OF THE INVENTION

This invention relates to torsional vibration dampers such as twin mass flywheels and in particular such flywheels used to connect an internal combustion engine with a gearbox on a motor vehicle.

BACKGROUND OF THE INVENTION

In, for example, the Applicant's earlier granted patents GB 2229793 and 2282868 and pending applications PCT/GB95/01976 and PCT/GB97/00361 there are described torsional vibration dampers in the form of twin mass flywheels in which an input element and an output element are relatively rotatable against the action of a damping means which includes a plurality of linkages each linkage including one or more link members which act as bob weights to provide a speed dependant damping on the relative rotation of the flywheel elements. The Applicant's earlier patent applications GB-A-2220464 and PCT/GB97/30302 also disclose torsional vibration dampers used in combination with a fluid coupling in which the relative rotation of input and output elements of the damper is again controlled by a plurality of such linkages.

Such vibration dampers can be prone to problems associated with tilting of the input element out of its normal plane of rotation due to flexing of the crankshaft of the associated engine. Such tilting can impose undesirable loadings in the linkages which interconnect the elements.

It is an object of the present invention to provide a vibration damper which at least partially mitigates the above problem.

SUMMARY OF THE INVENTION

Thus according to the present invention there is provided a torsional vibration damper comprising an input element and an output element which are relatively rotatable against the action of a damping means which includes a plurality of linkages, each linkage comprising one or more links mounted on one element via pivot pins and arranged to extend generally radially in use and connected with the other element by one or more additional links, damper being characterised in that the pivot pins of the generally radially extending links are supported from said one damper element via spaced bearings in said one damper element.

Such a spaced bearing arrangement is applicable to all the torsional vibration dampers disclosed in the above referred to earlier patents and applications when used as a twin mass flywheel where the input and output elements comprise input and output flywheel masses respectively or when used as a damper in which the input and output elements are of relatively light mass and are connected in a drive-line either as a separate unit or in combination with a fluid coupling as discussed above.

Such a torsional vibration damper may also include generally radially extending links which have an intermediate portion designed to flex in an axial sense to accommodate forces applied to the link via the associated additional link as a result of relative tilting of the damper elements.

The pins which mount the generally radially extending links are preferably a clearance fit in the bearings, the level of clearance being sufficient to ensure that any thermal expansion of the pins during use of the flywheel is insufficient to cause the pins to bind in the bearings.

For example, when a mounting pin of 10 mm diameter is used a clearance of 0.1 m (100 microns) between the internal diameter of the bearings and the external diameter of the mounting pin is sufficient (i.e. a clearance of the order of 1% of pin diameter).

The bearings can be in the form of plain polymeric bushes (for example polyimide resin with a filler such as graphite). Many other alternative plain bearing bush materials could be used, for example, a composite material comprising a PTFE/lead overlay with a bronze impregnated interlayer and a metal backing layer.

The bearing bushes may be directly mounted in the appropriate damper element or may be mounted via a metal or plastics housing. Such housings may include bush retaining flanges and may be of greater axial extent than the damper element in which they are mounted in order to allow the use of longer bearing bushes which lowers bearing contact pressure. The bearing bushes and/or housings may act as heat insulators to shield the pins to some extent against the worst effects of thermal expansion.

In an alternative arrangement the bushes may be axially retained by flanges provided on the element.

In certain applications needle bearings can be used instead of plain bearing bushes.

The pin is preferably hardened and is an interference fit in the associated link which is made from softer material. Typically the link will be made from mild steel and the pin from hardened steel with ground end portions which engage in the bearing bushes.

In an alternative arrangement the pin can be made from stainless steel and the end portions can be turned (i.e. produced by a lathe turning operation) to provide a helical patterned surface finish to assist bedding-in of the bearings.

If the pin is not made from harder material than the link the ends of the pin which engage the bearings are preferably of smaller diameter than the central portion of the pin which is an interference fit with the link in order to prevent damage to the pin end portions during assembly of the pivot.

In certain applications, particularly if needle roller bearings are employed, if may be desirable to hold grease captive within the bearing.

The invention also provides a torsional vibration damper comprising an input element and an output element which are relatively rotatable against the action of a damping means which includes a plurality of linkages, each linkage comprising one or more links mounted on one element via pivot pins and arranged to extend generally radially in use and connected with the other element by one or more additional links, the damper being characterised in that the generally radially extending links are mounted on their pivot pins via gimbal pins which allow axial pivoting of the links relative to the pins.

BRIEF DESCRIPTION OF SEVERAL VIEWS OF THE DRAWINGS

The present invention will now be described, by way of example only, with reference to the accompanying drawings in which.

DETAILED DESCRIPTION OF THE INVENTION

Figure 1:
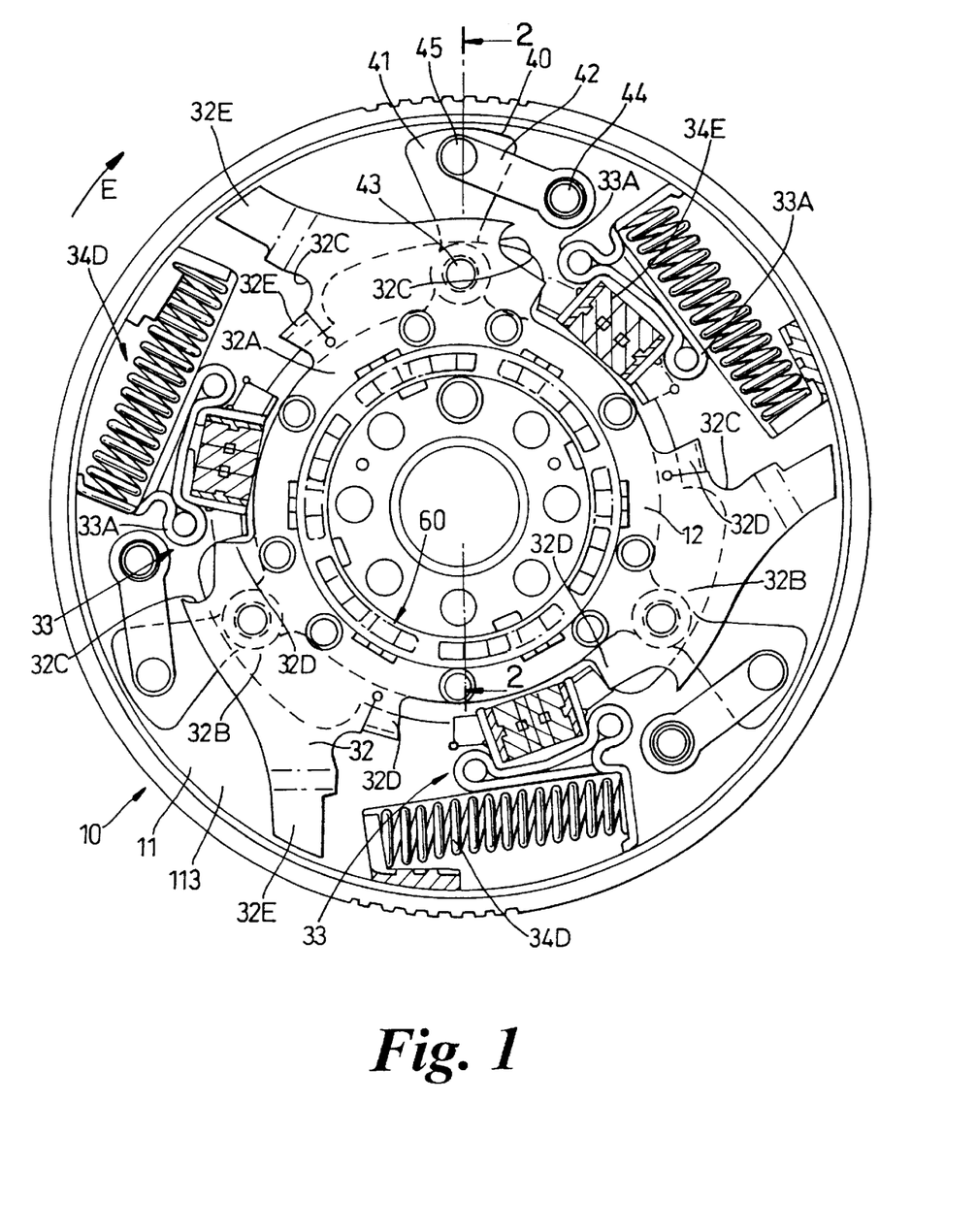
FIG. 1 is a view of a twin mass flywheel embodying the present invention taken in the direction B of FIG. 2.
Figure 2:
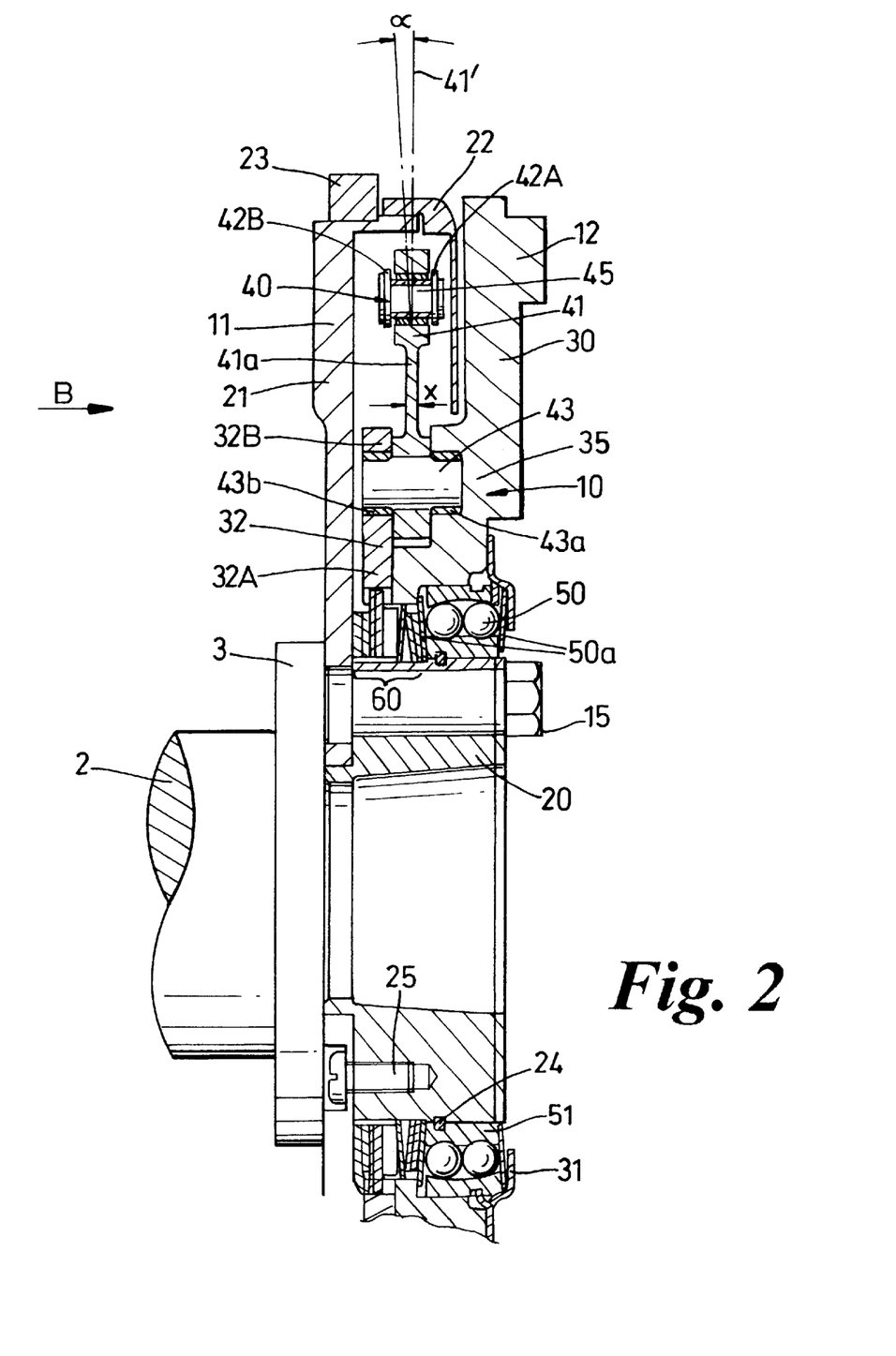
FIG. 2 is a sectional view taken along the line 2—2 of FIG. 1.
Figure 3:
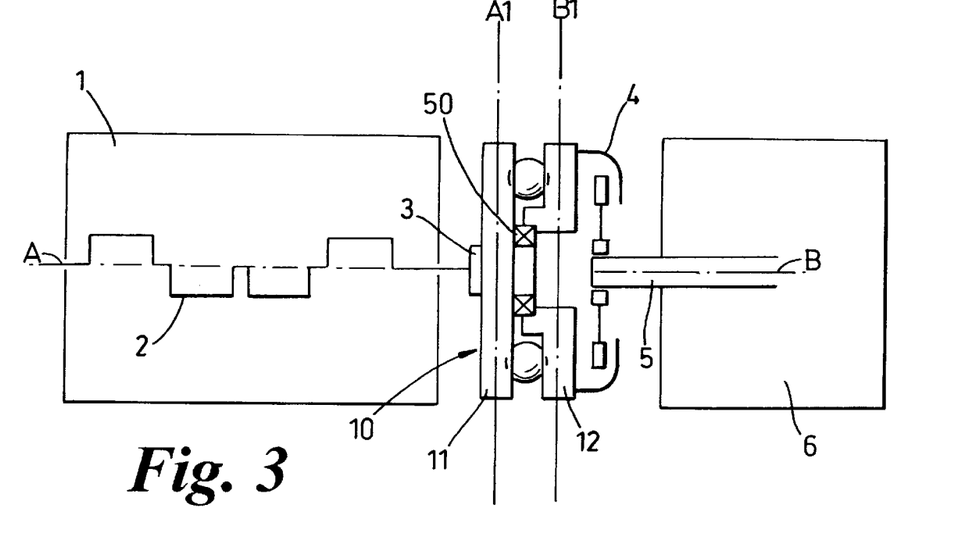
FIG. 3 is a diagrammatic representation of a twin mass flywheel with associated engine and gearbox.

With reference to FIGS. 1, 2 and 3 there is illustrated a torsional vibration damper in the form of a twin mass flywheel 10 which is formed by two damper elements 11 and 12. One flywheel mass 11 (also known as the input flywheel mass) is fixed to a crankshaft 2 of an internal combustion engine 1 by way of a central hub 20 and bolts 15. A friction clutch 4 is secured to the second flywheel mass 12 (also known as the output flywheel mass) to connect the second flywheel mass with the input shaft 5 of an associated gearbox 6.

The flywheel mass 11 comprises central hub 20, an input plate 21, a cover plate 22, and a starter ring 23 which is welded to the input plate 21. Cover plate 22 is secured at its outer periphery to input plate 21. Circlip 24 secures the inner race 51 of bearing 50 axially relative to the hub 20. The input plate 21 is fixed to hub 20 by screws 25 prior to assembly onto the engine, and then also by the main bolts 15.

The second flywheel mass 12 comprises an output plate 30 a bearing retaining plate 31, and a pivot plate 32 all rotationally fast with each other.

Under normal drive conditions and over-run conditions the twin mass flywheel 10 as a whole rotates in a clockwise direction in the view shown in FIG. 1 as indicated by arrow E. The engine crankshaft nominally rotates about axis A and the gear box input shaft nominally rotates about axis B. Design of the engine, twin mass flywheel and gearbox assembly endeavours to ensure that axis A and B are co-linear. However this is not always the case, especially under running conditions.

Pivot plate 32 has an annular inner portion 32A with plurality of lugs 32B which support pivots 43, a plurality of lugs 32C which in conjunction with abutments 33A form an end stop arrangement 33, and a plurality of lugs 32D, 32E which act on respective spring units 34D 34E.

Relative rotation between two damper elements 11 and 12 is controlled by a damping means which primarily comprises a plurality of pivotal linkages 40. The damping means also comprises the plurality of spring units 34D, 34E, a friction damping device 60 and the plurality of end stop arrangements 33. All these components assist in controlling the relative rotation of the two damper elements 11 and 12 at specific relative angular positions or in specific angular ranges.

Each pivotal linkage 40 comprises a generally radially extending link 41 (also known as a bobweight link) pivotally mounted between a centre hub portion 35 of the output plate 30 and pivot plate 32 by way of a first pivot 43, and an additional link 42 (in the form of a parallel pair of arms 42A and 42B) pivotally mounted on the input flywheel mass 11 (by way of a second pivot 44). The links 41 and 42 are pivotally connected to each other and bobweight 41 by means of a third pivot 45. It will be noted from FIG. 1 that the first pivot 43 is positioned radially inwardly of the second and third pivots 44 and 45.

The first pivot 43 is mounted in spaced bearings $43_a$ and $43_b$ in the centre hub portion 35 and pivot plate 32 respectively.

Under no-load conditions with the clutch 4 disengaged, centrifugal force acts on the pivotal linkages 40 and particularly on the first bobweight link 41 and urges the linkages in a radially outward direction with pivot 45 adopting a position radially outboard of pivot 43 as shown in FIG. 1 (this position is regarded as the neutral position between the drive and over-run directions of relative rotation of the damper elements). At higher rotational speeds the centrifugal force is greater and whilst this does not affect the configuration under no-load conditions it greatly affects the force required to move the flywheel mass 12 relative to the flywheel mass 11 i.e. the flywheel torsional stiffness.

If the clutch is engaged and power is transmitted in the drive direction from flywheel mass 11 to flywheel mass 12 there is a tendency for the two masses to rotate relative to each other (flywheel mass 11 rotates clockwise relative to flywheel mass 12 when viewing FIG. 1). At relatively low speeds when the influence of centrifugal force is smaller the damper elements move readily relative to each other i.e. the flywheel torsional stiffness is relatively low. However at relatively high speeds the influence of centrifugal force is much greater and relative rotation of the damper elements requires greater force i.e. the flywheel torsional stiffness is relatively high. Thus the flywheel torsional stiffness is speed sensitive.

If the clutch is engaged and power is transmitted in the over-run direction from flywheel mass 12 to flywheel mass 11 the effects are similar to the above except that the direction of relative rotation is reversed (flywheel mass 11 rotates anticlockwise relative to flywheel mass 12 when viewing FIG. 1) and in the embodiment shown in FIG. 1 the first link 41 folds between the second link 42 i.e. between arms 42A and 42B.

Input flywheel 11 is supported for rotation relative to output flywheel 12 by bearing 50 which may be a self-aligning bearing, in this case a double row self-aligning ball bearing which is held in position by retaining member 31 which is secured to output plate 30. Alternatively a non self-aligning bearing may be used.

Figure 4:
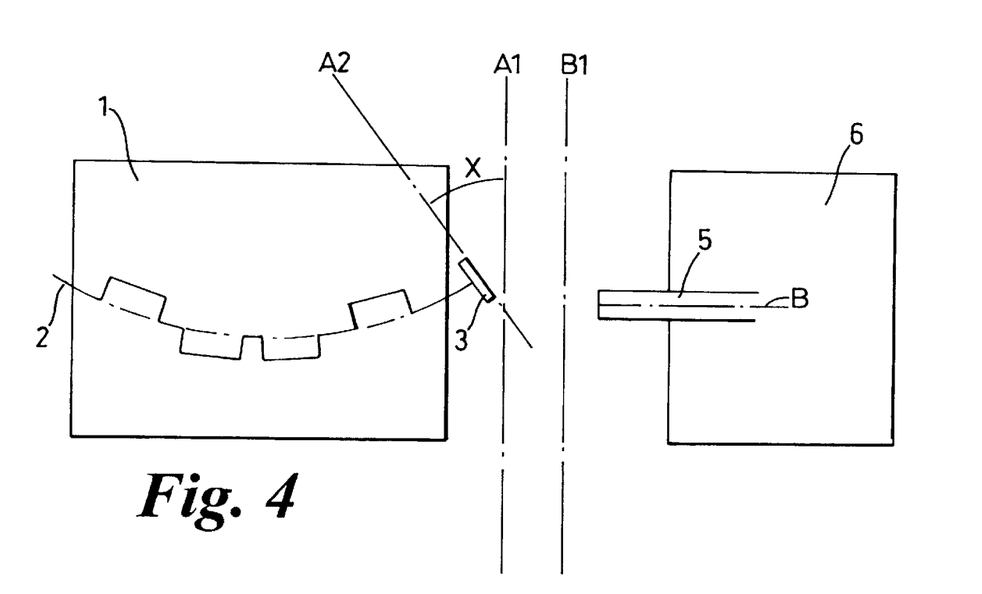
FIG. 4 is a diagrammatic representation of an engine and associated gearbox showing the engine crankshaft flexing.

During operation of the engine, the engine crankshaft 2 can flex, as shown diagramatically in FIG. 4. This flexing can be a first order vibration (i.e. the crankshaft flexes once per revolution) second order vibration (i.e. the crankshaft flexes twice per revolution, typically caused by the firing pulses in each cylinder in a 4 stroke engine) and also higher and lower orders of vibrations are possible. Such flexing causes the crankshaft flange 3 (and hence the attached input flywheel 11) to be tilted out of plane A1 in which it normally generally lies by a relatively small but significant amount (X degrees) and into plane A2. Because of the complicated nature of the crankshaft flexing this tilting manifests itself as a tilting vibration which may take the form of a swashing and/or axial movement of the input flywheel.

However the transmission does not cause any such tilting vibrations or swashing in the output flywheel which continues to lie generally in plane B1.

Thus in conventional twin mass flywheels there is a 'fight' between the forces tilting the input flywheel 11 out of its plane A1 and the forces keeping the output flywheel 12 in its true plane B1. This causes stresses in the twin mass flywheel components with the components of each flywheel mass tilting as they rotate by differing amounts depending on the stiffness of the various components. Typically these stresses are seen in the components which link the two flywheels, that is the damping arrangement and the bearing, thus reducing their service life.

However use of the self-aligning bearing 50 allows the input flywheel to lie in any plane as dictated by the flexing of the crankshaft, whilst also allowing the output flywheel to continue to lie in plane B1. Thus any misalignment or tilting of the planes of the input and output flywheels (A1, A2, B1) is accommodated in the self-aligning bearing rather than fought against. This reduces the stresses in the damping components and the bearing, thus increasing the service life of the twin mass flywheel. The range of tilting between the input and output flywheels which the self-aligning bearing 50 accommodates is typically from 0.2 degrees to 3.0 degrees and is more typically 0.5 degrees.

In particular, once the self-aligning bearing allows the output flywheel to rotate true in the plane B1, the bob weight 41 which is mounted in the output flywheel also runs true and is no longer forced to move back and forth axially as a result of tilting of the input flywheel. This significantly reduces the stresses on the pivot between the bobweight and the output flywheel thus increasing its service life.

Belleville springs 50a act to bias the planes of the input and output flywheels (A1, B1) parallel to each other and this can be advantageous in some circumstances e.g. during balancing or assembly of the twin mass flywheel.

Each generally radially extending bob weight link 41 has an intermediate portion 41a of reduced axial thickness 'x' which allows the link to flex in an axial sense by an angle (typically in the range 0.2° to 5°) relative to the remainder of the flywheel as shown in dotted detail 41' in FIG. 2 as a result of the forces applied to link 41 due to tilting of the input flywheel 11 as shown in FIG. 4. If desired, the bob weight links 41 may not include the reduced thickness intermediate portion 41a.

Although the flywheel 10 described above is provided both with a main self-aligning bearing 50 and the flexible links 41 the self-aligning bearing 50 may be omitted and the flexible links 41 may be used on their own in certain applications or omitted.

In accordance with the present invention the first pivot pins 43 are supported in spaced plain bearing bushes 43a and 43b. The pins 43 are preferably a clearance fit in the spaced plain bearings bushes 43a and 43b to ensure that any thermal expansion of pins 43 during use of the flywheel will not result in pins 43 binding in bearing 43a and 43b. Typically when a pin 43 of 10 mm diameter is used a clearance of 0.1 mm (100 microns) between the internal diameter of the bearings and the external diameter of the mounting pin is sufficient.

In the example shown, the bearings 43a and 43b are in the form of polymeric bushes (for example polyimide resin with a filler such as graphite). Many other alternative bearing bush materials could be used, for example, a composite material comprising a PTTE/lead overlay with a bronze impregnated interlayer and a metal backing layer.

Typically output plate 30, which is heated by clutch 4, is made from cast iron and can be arranged to expand sufficiently during use of the flywheel to ensure that bearing bushes 43a, 43b do not distort to cause binding of the pins 43 in the bushes.

Figure 5:
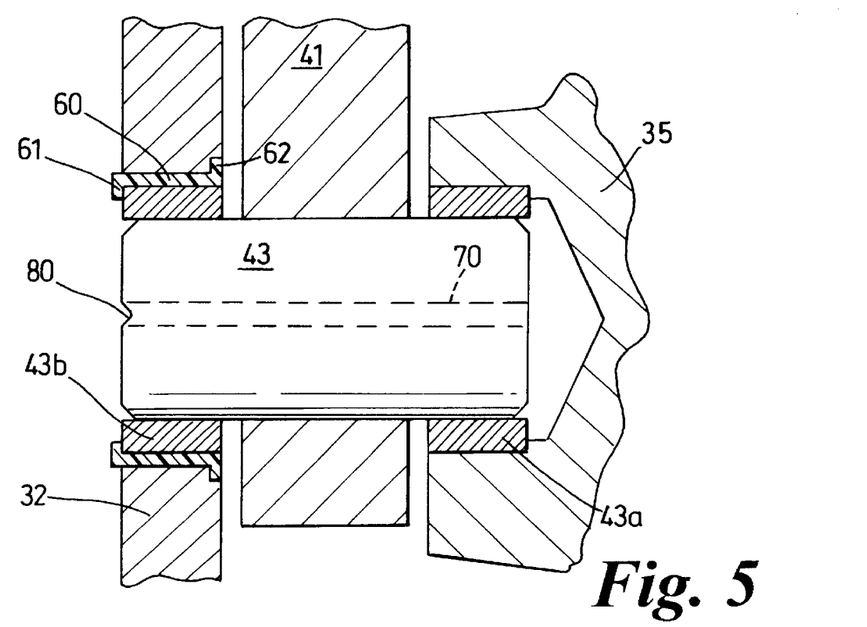
FIG. 5 shows on a larger scale details of an alternative spaced bearing arrangement.

The bearing bushes are directly mounted in the hub portion 35 and pivot plate 32 but could alternatively, as shown in FIG. 5, be mounted via a metal or plastics housing 60 in either hub 35 and/or plate 32 such housings may include bush retaining flanges 61 and 62 and may be of greater axial extent than the flywheel component in which they are mounted in order to allow the use of longer bearing bushes which lowers bearing contact pressure.

In an alternative arrangement (not shown) the bushes may be axially retained by flanges provided on the flywheel.

In certain applications needle bearings can be used instead of plain bearing bushes.

The pins 43 are preferably hardened and are an interference fit in the associated links 41 which are made from softer material. Typically the links will be made from mild steel and the pins from hardened steel with ground end portions which engage in the bearing bushes 43a and 43b.

In an alternative arrangement the pins 43 can be made from stainless steel and the end portions can be turned on a lathe to provide helical surface patterning on the end portions to assist bedding-in of the bearings.

If the pin is not made from harder material than the link the ends of the pin which engage the bearings 43a and 43b are preferably of smaller diameter than the central portion of the pin which is an interference fit with the link 41 in order to prevent damage to the pin end portions during assembly of the pivot.

In certain applications, particularly if needle roller bearings are employed, it may be desirable to hold grease 68 captive within the bearing. This may be accomplished, as shown in FIG. 6, by providing an end cap 65 on the pin 43 and seals, such as O-rings 66 and 67, operative between the fink 41 and the adjacent hub portion 35 and pivot plate 32 in grooves 66a and 67a respectively.

Figure 6:
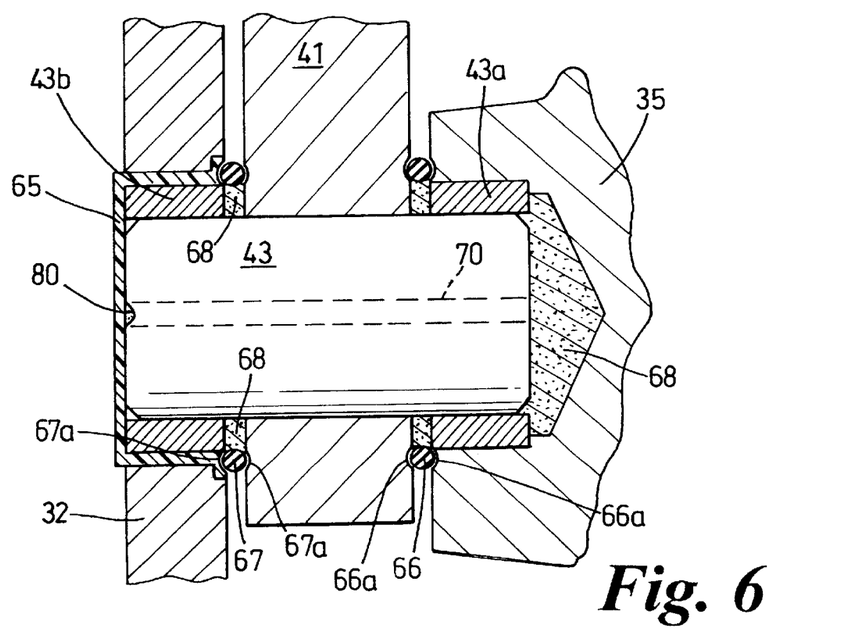
FIG. 6 shows details of a still further spaced bearing arrangement in which grease is held captive around the bearings by O-rings.

If desired the pins 43 may be provided with a central axial bore shown in dotted detail 70 in FIGS. 5 and 6. This bore minimises the effects of thermal expansion on the pin by providing an inner periphery defining the bore at which thermal expansion can take place and, when grease is used, allows the passage of grease from one end of the pin to the other.

The pins 43 may also be provided with coned end recesses 80 for the guidance of assembly probes during automatic assembly of the flywheel thus facilitating the lowering of the flange plate 32 into position on output plate 30.

Figures 7, 8:
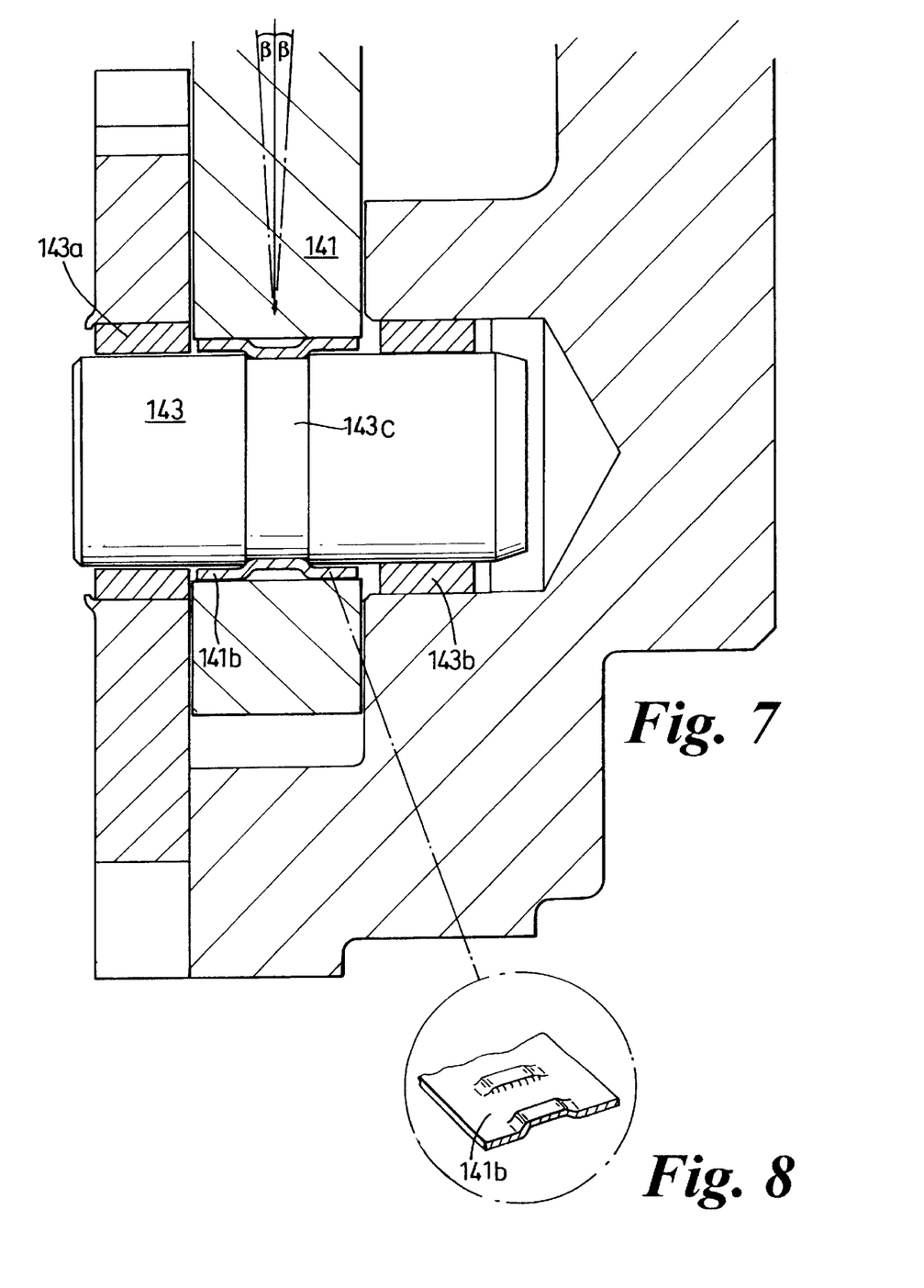
FIGS. 7 and 8 show details of a tolerance ring mounting arrangement for a bob-weight.

FIGS. 7 and 8 show yet a further measure for accommodating movement between linkage pivots 43 and 44. In this arrangement the bob-weight 141 is mounted on pivot pin 143 via a tolerance ring 141b. which allows bob-weight 141 to tilt relative to pin 143 through an angle β (typically 0.2 to 5.0 degrees). Tolerance ring 141b grips pin 143 so that pin 143 pivots with bob-weight 141 within spaced bearing 143a and 143b. Tolerance ring 141b also engages in a groove 143c in pin 143 to locate pin 143 axially.

Instead of locating bearing 143 by locally deforming the plate 32 and 32a the bearing may be provided with an integral flange (similar to flange 62 described above) which contacts plate 32.

Figure 9:
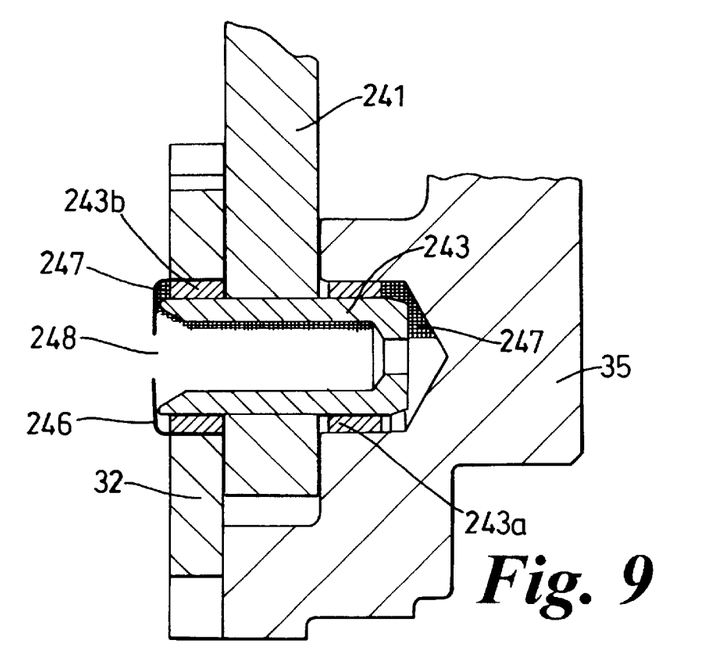
FIGS. 9 to 14 show details of yet further spaced bearing arrangements.

FIG. 9 shows a bob-weight pivot arrangement in which the bob-weight 241 is mounted on a pin 243 via bushes 243a and 243b. Bush 243a is pressed into hub 35 and bush 243b is pressed inside a cap or housing 246 which is itself pressed into plate 32. Bushes 243a and 243b are lubricate by grease which under centrifugal action occupies the locating shaded 247 in FIG. 9. A central opening 248 in cap 246 allows the passage of an alignment tool during automatic assembly of the device. No grease exits via opening 248 during use of the flywheel.

Figure 10:
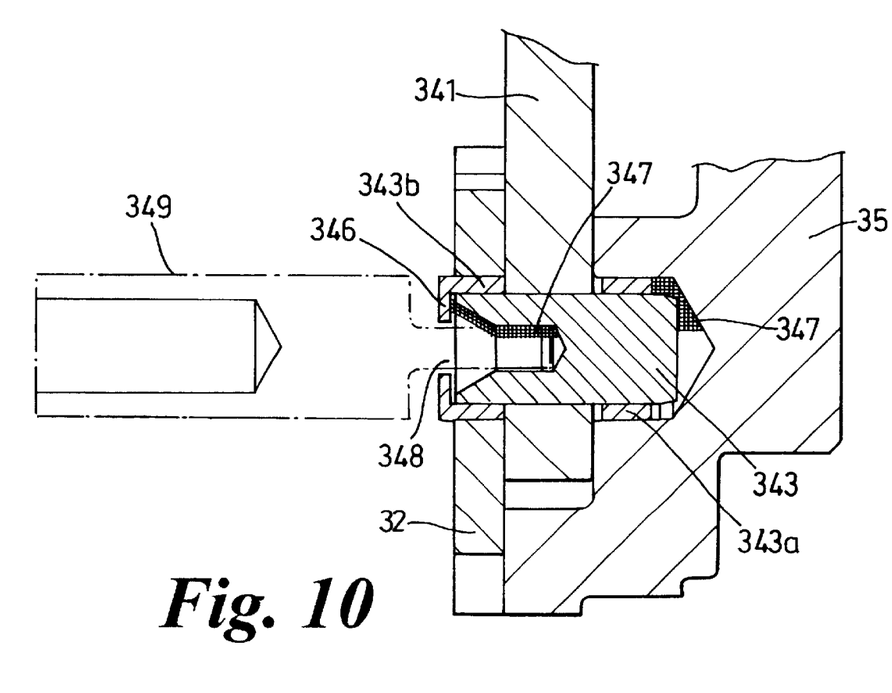

A FIG. 10 shows a bob-weight pivot arrangement in which a bob-weight 341 is mounted on a pin 343 via bearing bushes 343a and 343b of polymeric material. Bush 343b is provided with an end cap portion 346 having a central opening 348 for the passage of an alignment tool (shown in dotted detail 349) during automatic assembly of the device. Alignment tool 349 is offered up to hub 35 with plate 32, weights 341 and pins 343 etc. to align pins 343 with bushes 343a during assembly.

The bushes 343a and 343b are lubricated by grease which occupies the location shaded 347 when the flywheel is in use. The grease which lubricates bush 343b is injected after the removal of alignment tool 349.

Figure 11:
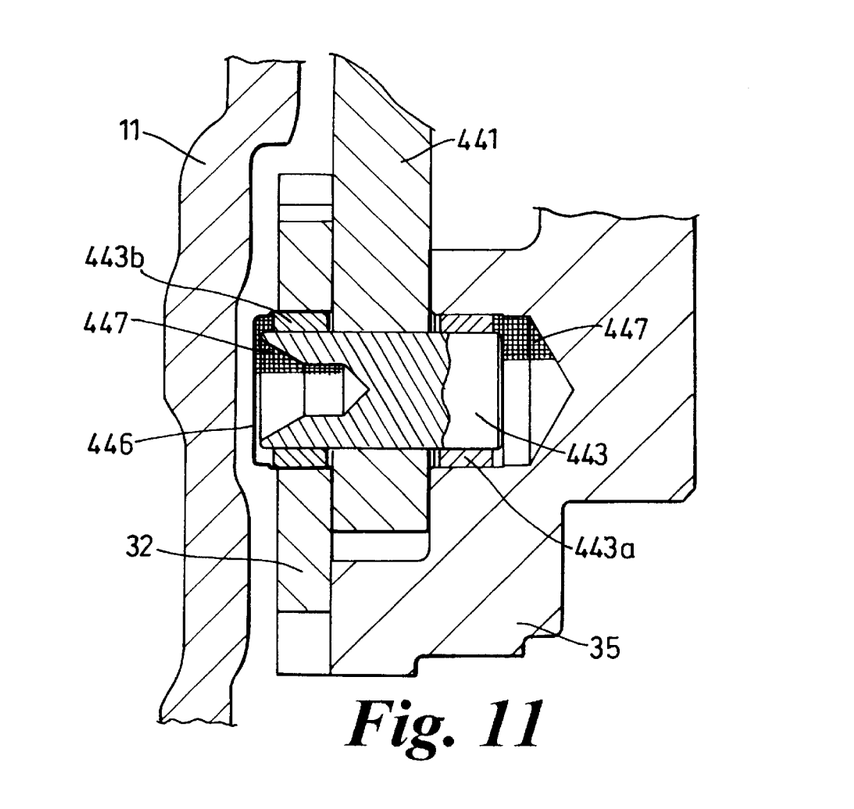

FIG. 11 shows a bob-weight pivot arrangement in which a bob-weight 441 is mounted on a pin 443 via bushes 443a and 443b. Bush 443a is pressed into hub 35 and bush 443b is pressed into a sheet metal cap or housing 446 which is itself pressed into plate 32. Bushes 443a and 443b are lubricated by grease which under centrifugal action occupies the location shaded 447 in FIG. 11.

Figure 12:
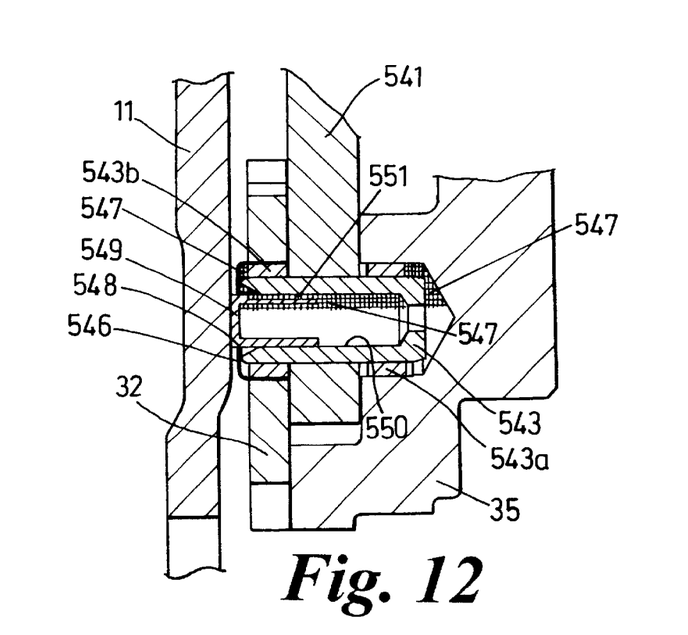

FIG. 12 shows a bob-weight pivot arrangement in which a bob-weight 541 is mounted on a pin 543 via bushes 543a and 543b. Bush 543a is pressed into hub 35 and bush 543b is pressed into a sheet metal cap or housing 546 which is itself pressed into plate 32. A plastics tubular cap 549 is push fit in a bore 550 in pin 543 and in a central aperture 548 in cap 546. Cap 549 has axial grooves 551 which allow grease to migrate to the locations shaded 547 in FIG. 12 under centrifugal action when the flywheel is in use.

Figure 13:
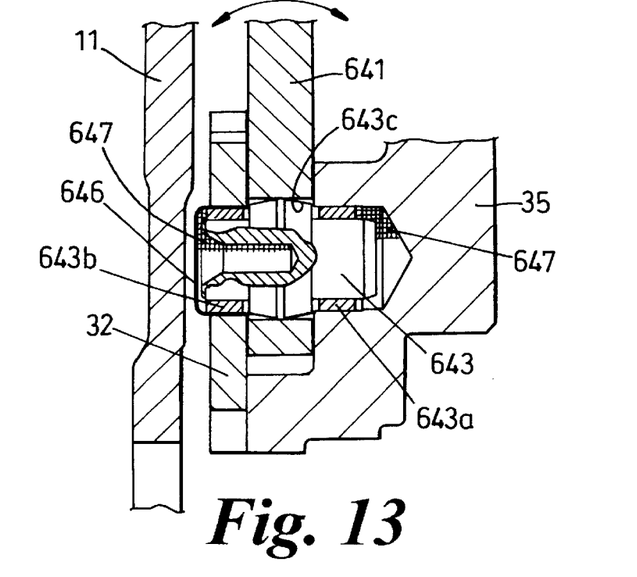

FIG. 13 shows a bob-weight pivot arrangement in which a bob-weight 641 is mounted on a pin 643 via bushes 643a and 643b. Bush 643a is pressed into hub 35 and bush 643b is pressed into sheet metal cap or housing 646 which is itself pressed into plate 32. Pin 643 has a central zone 643c which is part-spherical or barrel-shaped to allow weight 641 to pivot axially relative to pin 643 as indicated by arrow P. Lubricating grease again occupies the shaded location 647 of FIG. 13 when the flywheel is in use.

Figure 14:
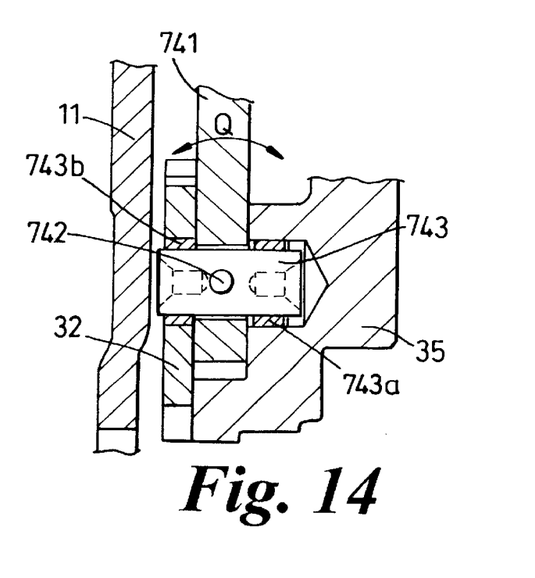
Figure 15:
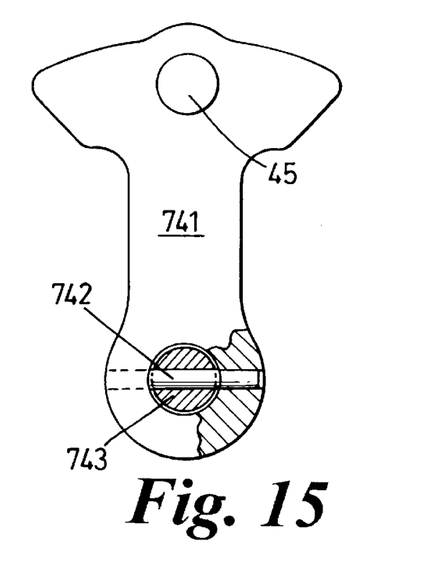
FIG. 15 shows details of a gimbal-pin mounted bob-weight.

FIGS. 14 and 15 show a bob-weight pivot arrangement in which bob-weight 741 is mounted on a pivot pin 743 by a gimbal pin 742 which allows weight 741 to axially pivot relative to pin 743 as indicated by arrow Q. Pin 743 is supported in bushes 743a and 743b which may or may not be lubricated by grease.

By mounting the pivot pins 43, 143, 243, 343, 443, 543, 643, 743 in spaced bearing bushes 43a, 43b: 143a, 143b: etc. the bearing contact pressure is lower as compared with an arrangement in which a single bearing is used with the bob weight 41, 141, 241, etc. Also, a more stable support of the associated bob weight 41, 141, 241, etc. is provided to resist the tendency of the bob weight to pivot axially due to tilting of the flywheel masses as illustrated in FIG. 4.

A further benefit of the use of spaced bearing bushes 43a, 43b, etc. is that if these bushes are greased the grease tends to migrate to the radially outer zones of contact between the bearing bushes 43a, 43b etc. and the associated pins 43, 143, etc. (as illustrated in, for example, FIG. 9) where the migrated grease is indicated by the shaded location 247. It is these radially outer zones of contact where the highest contact pressures occur due to the centrifugal forces generated by the bob weights 41, 141, 241, etc.

As indicated above, bushes 43a, 43b and all the other bushes 143a, 143; 243a, 243b: etc. may be in the form of polymeric bushes (for example polyimide resin with a filler such as graphite).

Many other alternative bearing bush materials could be used, for example, a composite material comprising a PTFE/ lead overlay with a bronze impregnated interlayer and a metal backing layer.

If desired needle bearings, or similar rolling element bearing arrangement, can be used instead of any of the plain bearing bushes 43a, 143b; 243a, 243b; etc.

As previously indicated, the present invention is not only applicable to a twin mass flywheel but is equally applicable to a torsional vibration damper where the input and output elements of the damper are of relatively light mass and are connected in a drive-line either on its own or in combination with a fluid coupling as discussed above.

What is claimed is:

1. A torsional vibration damper comprising an input element from which power is transmitted to an output element for onward transmission to a further drive line component via a damping means which includes a plurality of multi-links linkages, the input and output elements are relatively rotatable against the action of the damping means to absorb torsional vibrations and each linkage comprises one or more links mounted on one damper element via pivot pins and arranged to extend generally radially in use and connected with the other damper element by one or more additional links, the torsional vibrations damper being characterised in that the pivot pins of the generally radially extending links are supported from said one damper element via axially spaced bearings in said one damper element.

2. A damper according to claim 1 characterised in that the pins which mount the generally radially extending links are a clearance fit in the bearings, the level of clearance being sufficient to ensure that any thermal expansion of the pins during use of the damper is insufficient to cause the pins to blind in the bearings.

3. A damper according to claim 2 characterised in that the level of clearance is of the order of 1% of the diameter of the pins.

4. A damper according to any one of claim 1 characterised in that the spaced bearings are in the form of plain bearing bushes.

5. A damper according to claim 4 characterised in that the plain bearing bushes are of polymeric material.

6. A damper according to claim 4 characterised in that the bushes are in the form of a polymeric resin with a filler.

7. A damper according to claim 4 characterised in that the bushes are in the form of a composite material comprising a PTFE/lead overlay with a bronze impregnated interlayer and a metal backing layer.

8. A damper according to claim 7 characterised in that grease is held captive in areas of the contact between the pins and the bearings.

9. A damper according to claim 8 characterised in that at least one of the spaced bearings or, where used, the bearing mounting housing is provided with an end cap portion which retains the grease.

10. A damper according to claim 9 characterised in that the end cap portion includes an aperture for the passage of an assembly alignment tool.

11. A damper according to claim 10 characterised in that a cap with an axial passage therethrough for grease is positioned in the aperture in the end cap portion.

12. A damper according to claim 10 characterised in that the pins which mount the generally radially extending links each include bores or recesses for the receipt of the assembly alignment tool.

13. A damper according to claim 8 characterised in that the grease is retained by a seal operative between the generally radially extending link and said one damper element.

14. A damper according to claim 1 characterised in that at least one of the spaced bearings is mounted in said one damper element via a metal or plastics housing.

15. A damper according to claim 14 characterised in that the housing includes a first flange to retain the bearings within the housing.

16. A damper according to claim 15 characterised in that the housing includes a second flange to retain the housing within said one damper element.

17. A damper according to claim 14 characterised in that the housing has a greater axial extent than said one damper element in which it is mounted.

18. A damper according to any one of claim 1 characterised in that the axially spaced bearings are designed to act as heat insulators to shield the pivot pins from the effects of thermal expansion.

19. A damper according to claim 1 characterised in that the pins are in an interference fit in the generally radially extending links, the links being made from a softer material than that of the pins.

20. A damper according to claim 1 characterised in that the pins which mount the generally radially extending links each include an axially extending through bore.

21. A damper according to claim 1 characterised in that of the pins which mount the generally radially extending links have part-spherical or barrel-shaped zones to allow axial pivoting of the generally radially extending links relative to the pins.

22. A damper according to claim 1 characterised in that the generally radially extending links are mounted on their pivot pins via tolerance rings which allow axial pivoting of the generally radially extending links relative to the pins.

23. A damper according to claim 1 characterised in that the generally radially extending links are mounted on their pivot pins by gimbal pins which allow axial pivoting of the generally radially extending links relative to the pins.

24. A damper according to claim 1 characterised in that the generally radially extending links have a concentration of mass at their radially outer ends thus operating as bob-weights which damp the relative rotation of the input and output damper elements.

25. A damper according to claim 1 characterised in that the generally radially extending links are designed to flex in an axial sense to accommodate forces applied to the generally radially extending links as a result of relative tilting of the input and output damper elements.

26. A damper according to claim 1 characterised by being in the form of a twin mass flywheel where the input and output elements comprise input and output flywheel masses respectively.

27. A damper according to claim 1 characterised by being connected in combination with a fluid coupling.

* * * * *

UNITED STATES PATENT AND TRADEMARK OFFICE
CERTIFICATE OF CORRECTION

| | |
|---|---|
| PATENT NO. | : 6,348,000 B1 |
| DATED | : February 19, 2002 |
| INVENTOR(S) | : Richard David Maitland Cooke et al. |

Page 1 of 1

It is certified that error appears in the above-identified patent and that said Letters Patent is hereby corrected as shown below:

<u>Title page,</u>
Item [73], Assignee, change "AP Time Limited" to -- AP TMF Limited --.

Signed and Sealed this

Twenty-third Day of April, 2002

Attest:

JAMES E. ROGAN
Attesting Officer
Director of the United States Patent and Trademark Office